Patented Aug. 20, 1946

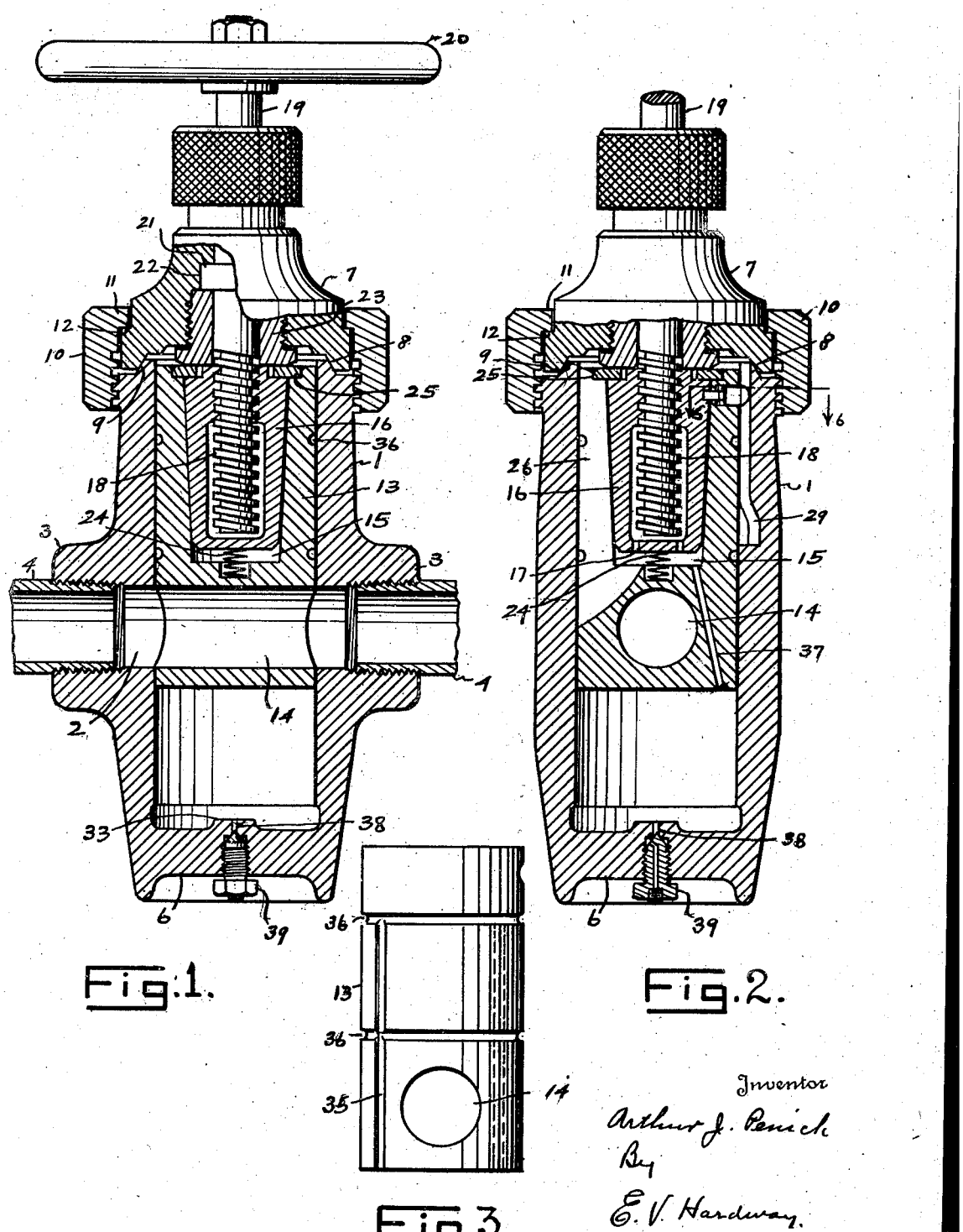

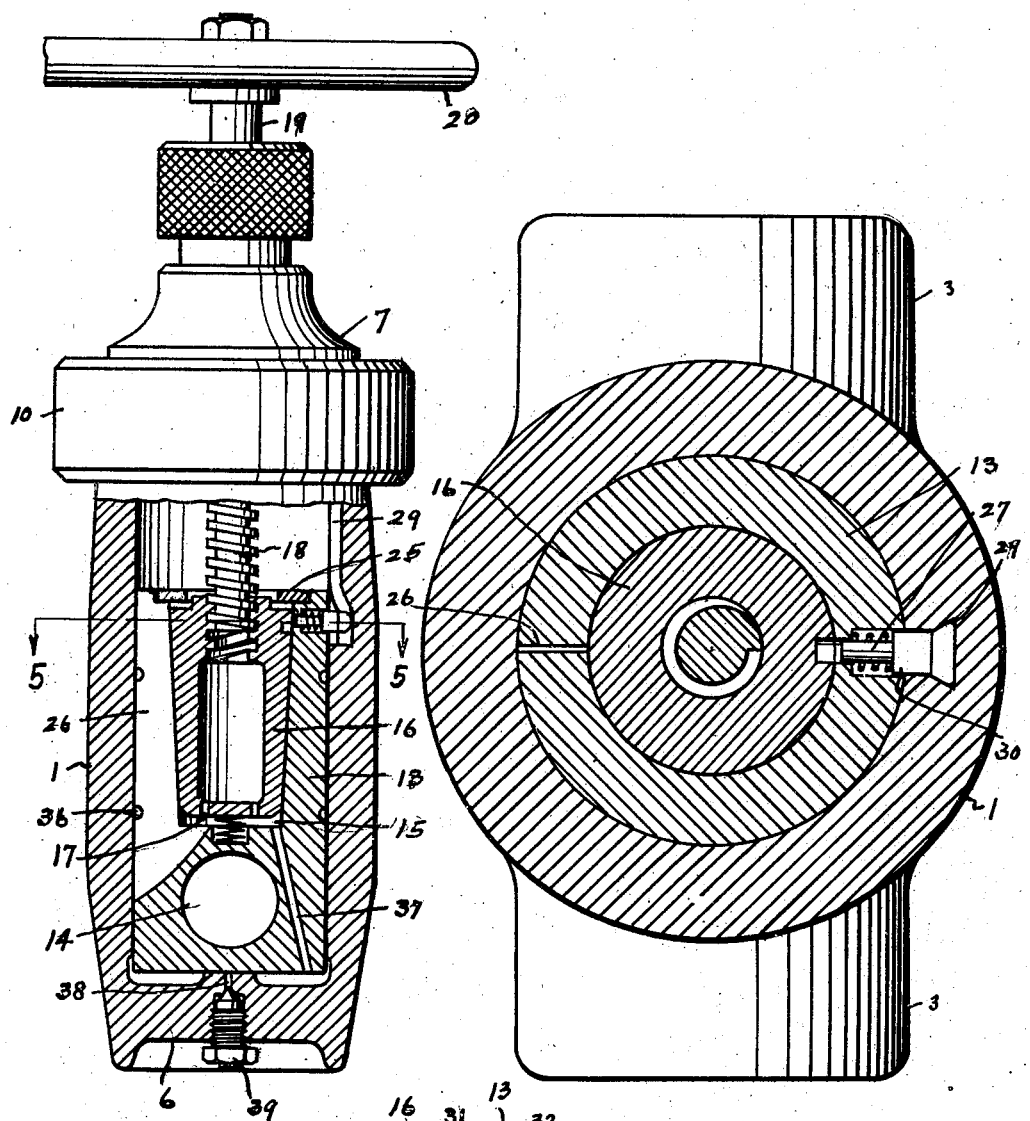
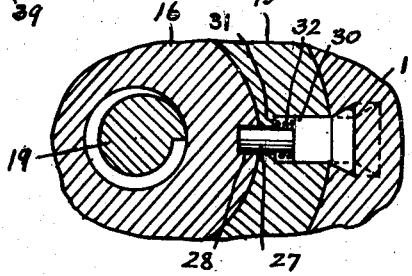

2,406,099

UNITED STATES PATENT OFFICE 2,406,099

VALVE ASSEMBLY

Arthur J. Penick, Houston, Tex.

Application October 16, 1943, Serial No. 506,610

2 Claims. (Cl. 251—71)

This invention relates to a valve assembly.

An object of the invention is to provide an assembly of the character described embodying a casing with a flowway therethrough and having a controlling assembly in the casing provided with a flowway which may be brought into alignment with the flowway of the casing to provide an unobstructed channel for the flow of fluid through the valve assembly; said controlling assembly being movable to another position to close the flowway through the casing and being expansible with means to expand the same to form fluid tight seals, when the valve is closed, to prevent leakage of the fluid flowing through the line into which the valve assembly is connected.

Another object of the invention is to provide novel means for expanding the controlling assembly.

The invention also embodies a novel lubricating system for lubricating the movable parts.

With the above and other objects in view the invention has particular relation to certain novel features of construction, operation, and arrangement of parts an example of which is given in this specification and illustrated in the accompanying drawings wherein:

Figure 1 shows a side view of the valve assembly, partly in section, showing the valve open.

Figure 2 shows a side view thereof taken at right angles to the view shown in Figure 1 and shown partly in section.

Figure 3 shows a side elevation of the controlling assembly.

Figure 4 shows a side view of the valve assembly, partly in section, showing the valve closed.

Figure 5 shows a cross-sectional view taken on the line 5—5 of Figure 4.

Figure 6 shows a cross-sectional, fragmentary view taken on the line 6—6 of Figure 2.

Referring now more particularly to the drawings wherein like numerals of reference designate the same parts in each of the figures the numeral 1 designates the valve casing which is, preferably substantially cylindrical in form. The casing has a flowway 2 transversely therethrough and may have the pipe connections 3, 3, around the flowway for the connection of the sections 4, 4, of the line to the casing. One end 6 of the casing is closed and mounted on the other end thereof is a bonnet 7 whose inner end is formed with a flared seat 8 which fits over a corresponding tapering seat 9 of the valve casing. The bonnet is secured in place by a clamp nut 10 which has an inwardly extending flange 11 engageable with an external annular shoulder 12 on the bonnet and the clamp nut 10 has a threaded connection with the valve casing as clearly shown in Figures 1 and 2.

Within the casing there is a cylindrical controlling assembly including the cylindrical sleeve valve 13 one end of which has the transverse bore 14 and the other end thereof has the longitudinal inwardly tapering bore 15 wherein there is fitted a tapering expander 16. This expander fits snugly in the bore 15 and is formed hollow. One end of the expander has the ducts 17 therethrough and the other end is internally and coarsely threaded to receive the coarse threads 18 of the valve stem 19. This stem extends axially through the bonnet and may be turned by any selected means as by the hand wheel 20. It is mounted to swivel in the bonnet by means of an external rib 21 thereon which rotates in inside annular groove 22 in the bonnet. The rib is retained in the groove by means of an inside gland 23 which is screwed into the bonnet against said rib.

The expander 16 is mounted on a coil spring 24 which is interposed between it and the bottom of the bore 15 and is retained against detachment from the valve 13 by means of the retainer ring 25 which is countersunk into the outer ends of the expander and valve and which is welded to the latter as shown in Figures 1, 2 and 4. Accordingly by turning the stem 19 the controlling assembly may be moved to open position as shown in Figure 1 or to closed position as shown in Figure 4.

Opposite the bore 15 the valve 13 is provided on one side with the longitudinal slit 26 so that the valve will be expansible. This slit is at right angles to the axis of the bore 14.

The expander 16 is normally held in its outer position by means of a pin 27 mounted in the valve and which projects into a socket 28 in the expander as shown more accurately in Figure 6. Its outer end extends out beyond the valve and is dovetailed and works in a vertical dovetail groove 29 in the inner wall of the casing and whose lower end is outwardly curved as shown in Figures 2 and 4. The pin has an external annular shoulder 30 and between said shoulder and the internal annular shoulder 31 of the valve there is a coil spring 32.

Upon movement of the valve from open position, shown in Figure 1, to closed position, shown in Figure 4, the expander and the valve will move as a unit until the valve lands on the stop 33. At the same time the pin 27 will have been withdrawn from the socket 28 by the outwardly curved end of the groove 29 assisted by the spring 32. Upon further rotation of the stem the expander 16 will be moved further into the bore 15 thus expanding the valve and causing it to fit very closely against the inside wall of the casing 1 around flowway 2.

Upon reverse movement of the stem 19 the expander assisted by the spring 24 will be retracted and as the controlling assembly moves toward open position the pin 27 will be forced back into the bore 28 and the parts of said assembly will be locked together.

The valve 13 has the external longitudinal channel 35 which connects with the circumferential grooves 36 therearound and it also has a duct 37 leading from the bottom of the bore 15 on through the corresponding end of the valve 13. A lubricant may be introduced into the valve chamber through the inlet duct 38 which is controlled by the plug 39 and said chamber kept partly filled with lubricant. As the controlling assembly is moved back and forth the lubricant will pass along the channel 35 into the grooves 36 to lubricate the valve and will pass through the duct 37 into the bore 15 to lubricate the expander and its bearings and will pass on through the ducts 17 and will finally reach the threads 18 as well as the bearings of the stem in the bonnet.

The drawings and description are illustrative merely while the broad principle of the invention will be defined by the appended claims.

What I claim is:

1. A valve assembly comprising a valve casing having a passageway therethrough for fluid; a controlling assembly in the casing embodying a sleeve valve which is slitted longitudinally and expansible at one end and having a transverse bore at the other end, an expander in the slitted end of the valve having an external socket, a pin slidably mounted in the valve and whose inner end is adapted to project into said socket and whose outer end extends out beyond the valve and is of a dovetailed shape; means connected with the expander for moving the controlling assembly to one position to align the bore with the passageway and to another position to align the valve with the passageway, said casing having a longitudinal inside, dovetailed groove whose inner end is outwardly turned, the outer dovetailed end of said pin working in said groove and being engageable therewith for retracting the pin from said socket as the controlling assembly moves to said last named position to release the expander to allow its further movement to expand the valve into close contact with the casing walls around said passageway.

2. A valve assembly comprising, a valve casing having a passageway therethrough for fluid, a controlling assembly in the casing embodying a sleeve valve which is transversely expansible, at one end, and having a transverse bore, at the other end, an expander in the expansible end of the valve having an external socket, a pin slidably mounted in the valve and whose inner end is adapted to project into said socket and whose outer end extends out beyond the valve; means connected with the expander for moving the controlling assembly to one position to align the bore with the passageway and to another position to align the valve with the passageway, said casing having a longitudinal inside, groove whose inner end is outwardly turned, means on the outer end of the pin engageable in and slidable along said groove for retracting the pin from said socket as the controlling assembly moves to said last named position to release the expander to allow its further movement to expand the valve into close contract with the casing walls around said passageway.

ARTHUR J. PENICK.